(12) United States Patent
Bechtold et al.

(10) Patent No.: US 7,716,998 B2
(45) Date of Patent: May 18, 2010

(54) DEVICE FOR MEASURING REACTION MOMENTS AND FORCES ON A LEVER

(75) Inventors: Nikolaj Bechtold, Erlangen (DE); Christian Schaufler, Herzogenaurach (DE); Horst Strobel, Herzogenaurach (DE)

(73) Assignee: Schaeffler KG, Herzogenaurach (DE)

( * ) Notice: Subject to any disclaimer, the term of this patent is extended or adjusted under 35 U.S.C. 154(b) by 102 days.

(21) Appl. No.: 12/103,220

(22) Filed: Apr. 15, 2008

(65) Prior Publication Data

US 2008/0276728 A1 Nov. 13, 2008

Related U.S. Application Data

(60) Provisional application No. 60/916,849, filed on May 9, 2007.

(51) Int. Cl.
*G01G 19/00* (2006.01)
(52) U.S. Cl. .................................. 73/862.621
(58) Field of Classification Search .. 73/862.61–862.69
See application file for complete search history.

(56) References Cited

U.S. PATENT DOCUMENTS

| | | | | |
|---|---|---|---|---|
| 4,747,313 | A * | 5/1988 | Okada | 73/862.043 |
| 5,115,351 | A * | 5/1992 | Miyawaki et al. | 359/849 |
| 5,814,773 | A * | 9/1998 | Latiri | 177/171 |
| 5,998,742 | A * | 12/1999 | Liu et al. | 177/210 EM |
| 6,730,013 | B1 * | 5/2004 | Shank et al. | 600/7 |
| 7,549,345 | B2 * | 6/2009 | Prevey | 73/856 |
| 2008/0277553 | A1 * | 11/2008 | Bechtold | 248/346.03 |

FOREIGN PATENT DOCUMENTS

DE 3922194 11/1990
DE 4102278 7/1992

* cited by examiner

*Primary Examiner*—Max Noori
(74) *Attorney, Agent, or Firm*—Volpe and Koenig, P.C.

(57) ABSTRACT

A device (1) for measuring reaction moments and forces on a lever (2) with at least one receptacle (9) for the lever (2) and with at least one carrier (42), wherein the receptacle (9) is fixed on the carrier (42) in opposite measurement directions deflectable relative to the carrier (42), and the device (1) is further provided with at least one fixed, supported sensor (50) for measuring deflections of the lever (2).

19 Claims, 4 Drawing Sheets

DEVICE FOR MEASURING REACTION MOMENTS AND FORCES ON A LEVER

CROSS-REFERENCE TO RELATED APPLICATIONS

This application claims the benefit of U.S. Provisional Application No. 60/916,849, filed May 9, 2007, which is incorporated by reference herein as if fully set forth.

BACKGROUND

The invention relates to a device for measuring reaction moments and forces on a lever with at least one receptacle for the lever and with at least one carrier, wherein the receptacle is mounted on the carrier so that it can be displaced relative to the carrier in opposite measurement directions, and the device is further provided with at least one stationary sensor for measuring deflections of the lever.

The subject matter of the invention relates to the class of devices for measuring reaction moments and forces on levers. The levers can be aids in measurement arrangements and are formed, for example, as measuring beams. In this case, the measuring beams are components of the measurement device, especially for measuring torques in rotating connections. Alternatively, the levers are sections of shafts or sections on articulated shafts, which are connected in an articulated way to another section via a joint. The reaction forces or reaction moments develop in the device as reactions to torques in rotating connections or in bearings or as reactions to bending moments in joints, when rotating connections or bearings are turned or joints are bent.

The moments of rotating connections are, for example, the torques that develop from friction and/or rolling contact in the rotating connection when two components supported so that they can rotate one on the other or one in the other, for example, the inner ring and the outer ring of a roller bearing, slide one on the other or are supported relative to each other on roller bodies arranged in-between. Here, the lever is turned about the rotational axis at least once 360°. As a rule, the torques of roller bearings should be as low as possible.

In articulated shafts of the drive train of vehicles, the bending moment is a measure for the prevailing play in the joint arrangement. However, for example, in so-called constant-velocity joints, especially in pin universal joints, the play is an evaluation criterion for the function of the articulated shaft arrangement. Unbalanced masses around the rotational axes of the articulated shaft sections can develop due to play that is too great.

The resistance at the bending point of a joint is designated as the bending moment, which is directed opposite the bending of two articulated shaft sections connected to the joint and can be detected and thus can be measured. The bending moment is dependent on the construction of the hinged connection and is comprised, for example, from friction moments and from other resistances of the roller contact at a joint of an articulated shaft of a motor vehicle. In such joints, the value of the bending moment is set at the freedom of play of the joint. The joints are installed intentionally with pre-tensioning. Friction is intentionally set, for example, between the ends of the pin joint and the bases of the universal joint bushings. With the measurement of the bending moment, this resistance can be tested together with other resistances, for example, together with the resistances from the radial roller bearings of the universal joint bushings. For this purpose, a joint section of the articulated shaft arrangement is fixed and the other pivots about one of the axes of the pin joint by an angle up to 90°.

With constant-velocity joints, a hinged connection, which transmits torques and which must allow relative axial movements between the articulated shaft sections, is produced between two articulated shaft sections. For this purpose, the joints usually feature roller bodies, which are guided in raceways and on which the two joint sections roll relative to each other so that they can move in the axial direction and by means of which the joint sections are engaged with each other to transmit torque with a positive fit in the peripheral direction. The friction moments should be as small as possible in this arrangement.

Pin universal joints are hinged connections transmitting torques between two articulated shaft sections without play as much as possible in all directions. In pin universal joints, each of the articulated shaft sections is provided with a joint yoke. The two joint yokes are connected by a universal joint so that they can pivot about two joint axes and are supported usually with low friction as much as possible on the pin of the universal joint via roller bearings. Each of the joint axes corresponds to one of the pin joint axes, which are oriented perpendicular to each other and which cross at the center of the universal joint.

Small play in joint arrangements is important for the function of the articulated shaft. Because the constant-velocity joints should allow axial compensation, the play is positive. Positive plays are air gaps between elements supported one on the other. These plays should be as small as possible, but should also be provided to keep the bending moments small. In contrast, in pin universal joint arrangements, the point and the joint yokes are mounted, as already mentioned above, so that they can move relative to each other, without play, and with pre-tensioning. In order to guarantee freedom of play, the elements are preferably mounted relative to each other with negative play, that is, with pre-tensioning. A measure for the freedom of play or the measure for the pre-tensioning, with which the joint yokes and the pin joint are to be mounted or are assembled with each other is the bending moment, with which the pre-tensioned joint can bend about the respective joint axis.

DE 39 22 194 C1 describes a method and a device of the most general form for measuring bending moments in pin universal joint arrangements. The device is formed by a holder, with which an articulated shaft section is held stationary. The joint yoke of this joint section is oriented in the device so that the other articulated shaft section is driven by the pivot drive so that it can pivot about the joint axes of the pin joint. A bending rod, whose fibers of the outer skin are elongated or compressed as a function of bending direction and resistance of the joint, is arranged between the pivoting joint section and the pivot drive. Expansion measurement strips, with which the expansion of the fibers is detected and converted into corresponding electrical voltage magnitudes, are arranged on the outer skin.

The pivot drive is connected in an articulated way to a radial guide and then via a ball-and-socket joint to the bending rod. The radial guidance can pivot with a pivoting angle of 90° about the rotational axis of the articulated shaft arrangement in the sense of rotation by the pivot drive.

With the method described in DE 39 22 194 C1, in the device counter-acting bending moments about the two joint axes when the moving joint section bends relative to the rigid joint section are measured. For this purpose, the radial guidance is pivoted about the rotational axis on an arc by 90° in the sense of rotation by means of the pivot drive. Here, the counteracting bending moments on the joint axes are first detected in the form of tension magnitudes on the expansion measurement strips of the bending rod. These tension magnitudes are proportional to the bending moments, are recorded, and are selectively converted and displayed legibly in a display device.

DE 41 02 278 A1 shows and describes a device for measuring forces and moments in articulated shaft arrangements with constant-velocity joints. This device has a stationary receptacle, in which one of the joint sections is held rigidly. The other articulated shaft section can pivot relative to the fixed articulated shaft section by the joint. A so-called force-measuring device for force-path measurement, in which the pivoting articulated shaft section is held, is arranged on the pivot axis between the contact of the pivot drive and the joint. The bending moments are converted into deflections (paths) of the receptacle, which are caused in the device by reaction forces to the moments on the bearing.

In the arrangement from DE 41 02 278 A1, an articulated shaft section is held in a receptacle, which is supported so that it can move radially and axially by means of elastic means on carriers. Carriers are fixed in place, for example, on a base plate of the measurement device. The elastic elements should counteract the axial and radial movements and as much as possible have no restoring forces. Force measurement sensors are arranged between the suspended receptacle moving radially and axially and the non-moving carriers.

With force measurement sensors, usually the forces acting on the sensor are not measured directly. These sensors react to the displacement of objects from a starting position with displacements of sensor elements or through their deformation. The displacements and deformation result from forces or from moments. The reactions in the device are first displacements against defined resistances and then the displacement or deformation of sensor elements. In one evaluation device, signals due to deformation are finally converted into force measurement values.

With force sensors, usually compression, shear, and tension forces are all measured. Most force sensors work with at least one spring-elastic body, whose elastic deformation is measured, or they react in a different way, for example, to changes in position using moving elements. Examples for such sensors are tension or compression rods or bending beams or membrane force sensors with expanding measurement strips. In these arrangements, the spring-elastic body is the rod or the bending beam, which is deformed elastically by the force. The force is received in a prescribed direction. The expanding measurement strips are oriented in this direction accordingly. The deformations of the spring-elastic body usually formed from metal are transmitted to the expanding measurement strips, so that these expand and, expressed simply, cause changes in the electrical resistance due to the expansion. The resulting electrical signals are converted into force measurement values.

Alternative force measurement sensors are, for example, piezoelectric force sensors that react to pressure. In a piezoceramic element, a voltage that is proportional to the force is generated due to the force. This voltage can be measured. The use of any suitable force sensor, for example, force sensors with electro-magnetic compensation or other force sensors with distance sensors and current regulation, is also conceivable.

The elastic means, on which the receptacle from DE 41 02 278 A1 is held, are elastically flexible like a hinge only in the pivoting directions, in which the articulated shaft section is pivoted for measuring bending moments. The bending moments are detected at sensors as deflections of the receptacle from an origin or position. The deflections are caused by reaction forces to the moments on the bearing. In the radial and axial direction, the means formed as leaf springs are rigid. Because the axial deflections resulting from the forces are to be measured with this device, the carrier again sits on two other elastic means that can be deflected axially relative to the base plate. These means are also leaf springs, which act in the pivoting directions and are radially rigid but act like a hinge in the axial direction. Sensors, which receive the deflection of the articulated shaft section, are each arranged between fixed carriers and the moving articulated shaft section.

As described in DE 41 02 278 A1, the measurement values are influenced by a coupling equalizing axial movements and by restoring moments of the elastic elements. In addition, the weight of the articulated shaft section is supported on the leaf springs, of which the latter leaf springs also must still receive a part of the weight of the device as a compression or bending load. The leaf springs are strongly dimensioned, in order to withstand these loads without bending and have correspondingly high restoring moments, which can overlap the reaction forces to be measured in the device. Before the beginning of the measurements, complicated calibration processes must be performed, in order to remove the influence of the previously mentioned factors on the measurement results.

SUMMARY OF THE INVENTION

The invention is directed to a device in which the previously mentioned disadvantages are avoided.

In the device according to the invention, the receptacle is suspended on the carrier by at least one pendulum arm and can freely oscillate relative to the carrier at least in the measurement directions. The measurement directions are at opposite directions on a common axis or on a common pivoting arc.

A pendulum is a mass at the end of a cord or at the end of a moving suspended rod or at the end of a rod that can be deflected. The pendulum hangs vertically in the rest position due to the force of gravity. If a free pendulum is deflected from its vertical rest position, it swings back due to the influence of the force of gravity and comes to rest at the lowest point of the pivoting path in the rest position. The pendulum frequency of the pendulum depends on its length, but not on the mass.

The receptacle is suspended on at least one pendulum arm without additional contact on the carrier or on other components of the device and is thus the mass of the pendulum. In addition, the weight portion of the lever supported in the receptacle is also included in the mass. The force of the weight of the lever or the articulated shaft section and the force of the weight of the receptacle are parallel in the rest position. According to a preferred construction of the invention, the mass of the pendulum is composed from the mass of the receptacle and the total mass of the first articulated shaft section. The total mass of the first articulated shaft section is then calculated with the mass of the pendulum, when the articulated shaft section is supported at its center of gravity in the receptacle.

The pendulum arm is first, at least in the rest position, loaded only in tension. The weight of the lever or the articulated shaft section loaded with tolerances has no influence on the measurement results. The measurement results are more precise due to the device according to the invention. The pendulum arm can be constructed as a cord like a classical pendulum or as a tensioned band.

Another construction of the invention provides that the pendulum is a rod. The rod is either clamped so that it can pivot on the suspension or alternatively clamped rigidly on the suspension. If the rod is clamped rigidly, it is elastically bendable at least in the pendulum directions. If the pendulum arm is elastically bendable, this is shaped as long as possible, in order to keep the restoring moments resulting from the elastic bending characteristics of the rod as small as possible.

One construction of the invention provides that the pendulum arm is constructed in a rigid, non-elastic way in the tension directions, in which the pendulum arm is tensioned by forces of gravity and mass during pendulum movement, in order to remove as much as possible the effects vertical to the measurement direction from the mass and forces of mass on the measurement results.

With another construction of the invention it is provided that the pendulum arm is rigid in all of the directions directed perpendicular to the measurement directions. Therefore, all of the influences on the measurement results from transverse and axial forces on the lever/articulated shaft section and on the device are removed as much as possible. In these cases, cords or bands cannot be used. Preferably, rods such as flat materials are used, preferably leaf springs and similar elements with high moments of resistance against bending in the directions, in which the receptacle cannot pivot. The moment of resistance against bending in the measurement directions at least at the suspension point. This can be realized by elements with correspondingly small cross sections clamped on the carrier. Alternatively, elements are provided, which are suspended in an articulated way in the pivoting direction and are otherwise rigid.

Thus, with one construction of the invention it is also provided that the pendulum arm is at least one leaf spring or one leaf spring package. The leaf spring or the leaf spring package is arranged elastically bendable in the pivoting direction and is clamped or fixed preferably rigidly on the carrier.

The receptacle is preferably suspended on two parallel pendulum arms and is thus more stable. The lever is preferably held in the receptacle between two leaf springs, which are parallel and opposite each other in the measurement direction. In this case, the weight of the receptacle and the lever is distributed proportionally at least in the rest position to tensioned pendulum arms.

Another construction of the invention provides that the sensor is at least one bending beam with expanding measurement strips. The bending beam is preferably made from metal, such as light metal. The fibers, which can expand due to bending, in the surface of the bending beam are provided with expanding measurement strips. One end of the bending beam is preferably fixed in place relative to the receptacle on the device. The carrier, on which the receptacle is suspended, is preferably fixed in place permanently or detachably on the device. Here, the carrier can be arranged so that it can move longitudinally with the receptacle, for example, with a sled.

In the device, one or several sensors is or are oriented relative to the receptacle so that the receptacle acts at least on the sensor or sensors at the same time or one after the other or as a function of the direction when the receptacle is deflected. The use of the sensors of a wide range of constructions already described above is conceivable. A preferred construction of the invention provides a sensor, which is at least one bending beam with expanding measurement strips. The bending beam can have any conceivable shape and form and is preferably made from metal, for example, from an aluminum alloy. The end of the bending beam is stationary relative to the receptacle.

Dimensional and position deviations, for example, alignment errors between the rotational axes of the lever and the longitudinal axis of the receptacle in the device, can have the result that the receptacle assumes a position, which does not correspond to the rest position in the reverse point of the path of the pendulum, after the placement of the lever and before the beginning of the measurements. Because the sensors of the class-defining state of the art are in constant contact with the receptacle, these undesired displacements are already detected in the rest position as restoring moments or forces and falsify the actual measurement values.

The invention therefore provides that the receptacle and the bending beams are arranged relative to each other without touching in the rest position of the receptacle. In other words: the receptacle and the sensors are spaced apart from each other with as little play as possible, so that the sensors can be acted upon by the receptacle pivoted out of the rest position after only a short path movement of the receptacle. The play is adapted in its size to the possible dimensional and position deviations from the desired value in the rest position and is, for example, <0.05<0.1 mm. The return stroke appearing in this case at the beginning of the regular measurements and any resulting hysteresis and its effect on the measurement results can be eliminated by a one-time calibration when the sensors are installed. Thus, calibration processes that are to be repeated continuously and that are expensive are avoided when changing test samples.

The device can be used, as already explained above, for a wide range of rotating and bending moment measurements on arbitrary machine elements. The device, however, is preferably provided for measurements of bending moments of a joint of an articulated shaft. When a first articulated shaft section is bent with the device opposite a preferably fixed second articulated shaft section, reaction moments and forces caused by bending moments are generated on the first articulated shaft section in the receptacle. For this purpose, the first articulated shaft section is placed in the receptacle and pivoted with the device about the joint axis. Accordingly, the device is spaced apart from the pivot axis of the rotating connection or the bending axis of a joint.

As already explained above, a portion of the weight of the first articulated shaft section is supported in the receptacle. Another portion of the weight of the first articulated shaft section is supported in the joint. Articulated shaft sections are heavy, so that their portion of weight to be supported is relatively high. Depending on the center of gravity of the first articulated shaft section, on the distance of the bending axis to the contact in the receptacle, and on the lever of the center of gravity to the bending axis, additional forces and moments are generated in the joint. The influence of this portion of the weight to the bending moments in the joint can therefore be relatively high and higher than the actual original bending moments appearing in the bearing. The measurement results can be falsified. Therefore, every new articulated shaft installed into the device of the class-defining state of the art must be calibrated in a complicated process before the beginning of the measurements of bending moments.

One construction of the invention provides that the first articulated shaft section is supported at its center of gravity in the receptacle, so that the lever effect and reactions resulting from the weight of the articulated shaft section are avoided in the joint.

Other constructions of the invention, as well as embodiments of this invention, are described below.

BRIEF DESCRIPTION OF THE DRAWINGS

The invention is explained in more detail below with reference to embodiments. Shown are.

DETAILED DESCRIPTION OF THE PREFERRED EMBODIMENTS

Figure 1:
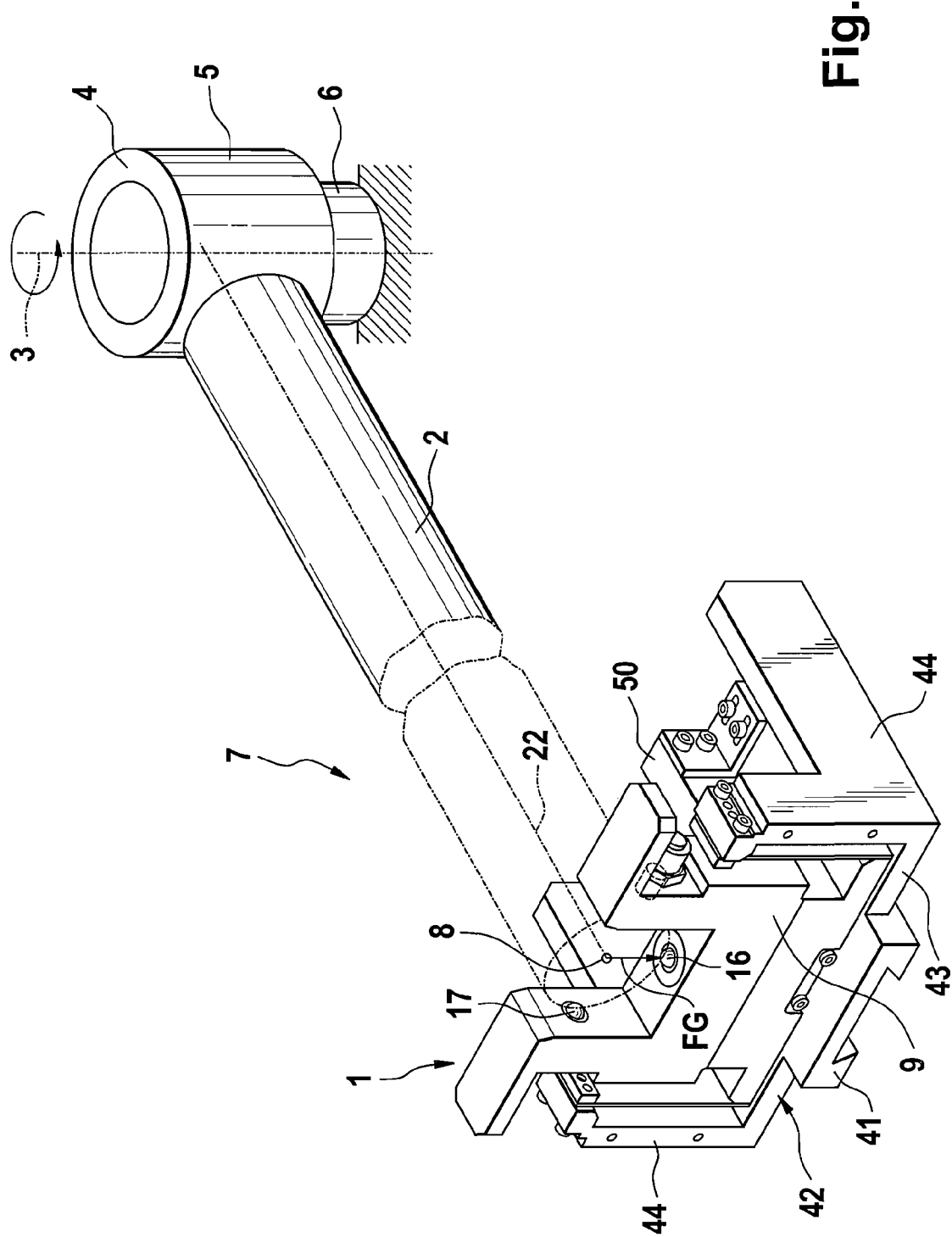
FIG. 1 is a view of a measurement arrangement with a device for measuring reaction moments and forces on a lever pivoting or rotating about a rotational axis.

In FIG. 1, a device 1 for measuring reaction moments and forces on a lever 2 is shown in a measurement arrangement 7. A receptacle 9 holds the lever 2. The device 1 with the lever 2 can at least pivot about a rotational axis 3 or can rotate about the rotational axis 3 on a circular path. The rotational axis 3 is oriented in this example horizontally, but can also be oriented vertically or in some other direction. The device 1 is spaced apart from the rotational axis 3 in the radial direction and can pivot/rotate with the lever 2 about the rotational axis 3.

The lever 2 is connected rigidly to a rotating connection 4. This rotating connection 4 can be, for example, a sliding or rolling bearing. The lever 2 is then connected, for example, to the outer ring 5 of the bearing. The weight of the lever 2 is typically supported on the pin 6, which is a component of the device 1 and is stationary on this device and on which sits the rotating connection 4 or a bearing. Because the force of gravity FG contacts the lever at a distance to the pin center (relative to the rotational axis 3), transverse forces are produced in the rotating connection 4. Such transverse forces generate additional moments, which are superimposed on the original moments of the rotating connection 4 and which are thus undesired, in the rotating connection. Therefore, the lever 2 is preferably held at its center of gravity 8 in the receptacle 9, so that the rotating connection 4 is free from the influences of the force of gravity FG.

Figure 2:
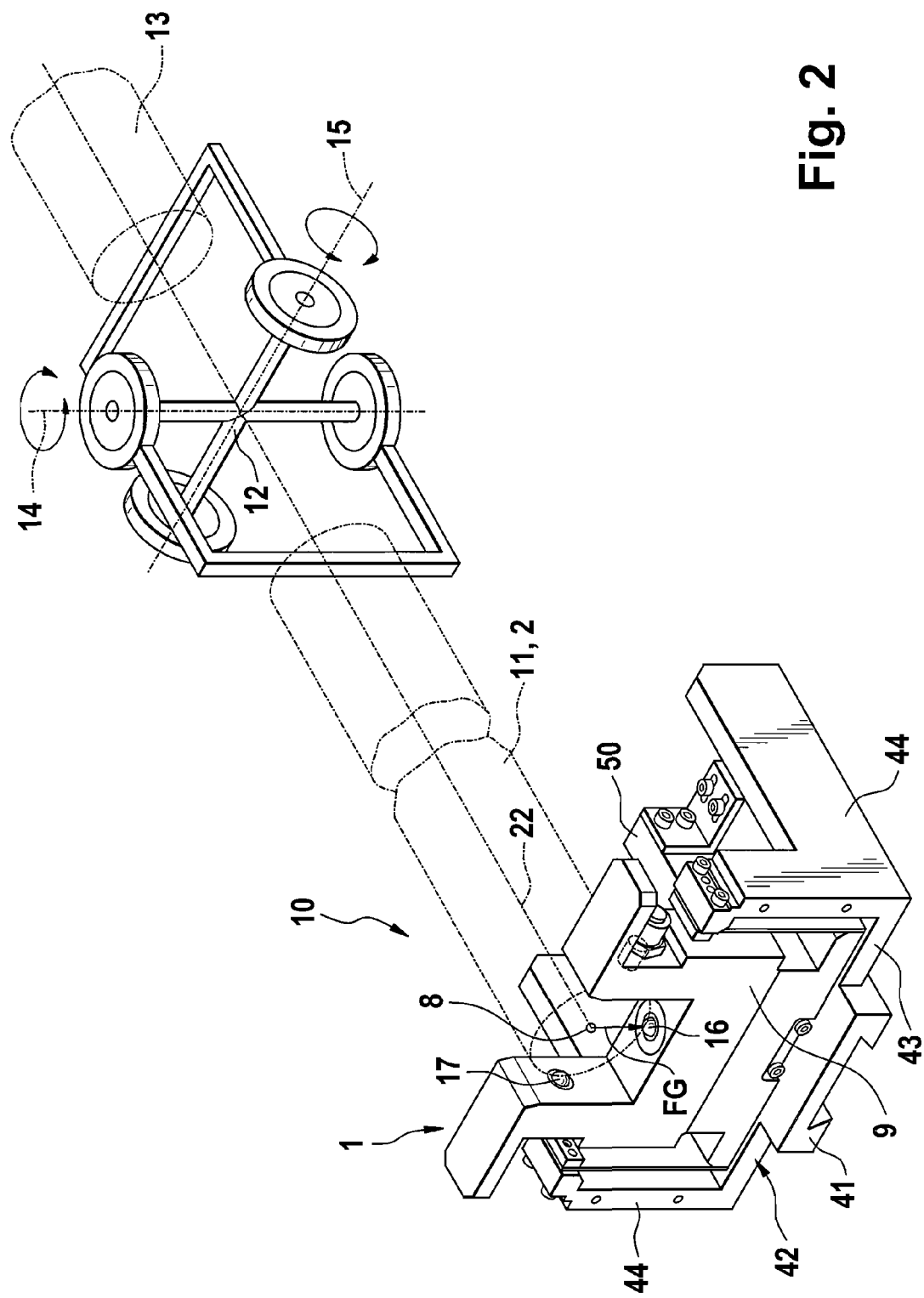
FIG. 2 is a view of the device from FIG. 1 in a measurement arrangement, in which the bending moments of an articulated shaft arrangement are measured or compared.

FIG. 2 shows the device 1 in a measurement arrangement 10 for measuring bending moments of a joint 12 in the form of a pin universal joint, which connects the two pivoting articulated shaft sections 11 and 13 in an articulated way. The lever 2 is the first articulated shaft section 11, which is connected in an articulated way by a joint 12 to a second articulated shaft section 13. In the representation from FIG. 2, the device 1 with the articulated shaft section is pivoted about the vertically oriented rotational axis 14. It is also conceivable that measurements are performed about the rotational axis 15 oriented horizontally in the representation. It is typical that measurements are first executed about the rotational axis 14 already oriented vertically in the figure, then the articulated shaft arrangement with the joint 12 is turned, so that the previously horizontally oriented rotational axis 14 becomes vertically oriented, and then the articulated shaft section is bent about the rotational axis 15 for further measurements. The device 1 prevents the joint 12 from buckling about the horizontal axis 15 for measurements of the torque about the vertically oriented axis 14.

The force of gravity FG of the lever 2 or the first articulated shaft section 11 is supported in the device 1 according to the invention on a first ball 16. At the side, the lever 2 or the first articulated shaft section 11 is guided and clamped between two opposing second balls 17 and 18 (see also FIG. 3). The second balls 17 and 18 transmit the reactions, which result from the torques to be measured in the measurement arrangement 10 in the rotating connection 4 or in the joint 12, to the pivoting device 1.

Figure 3:
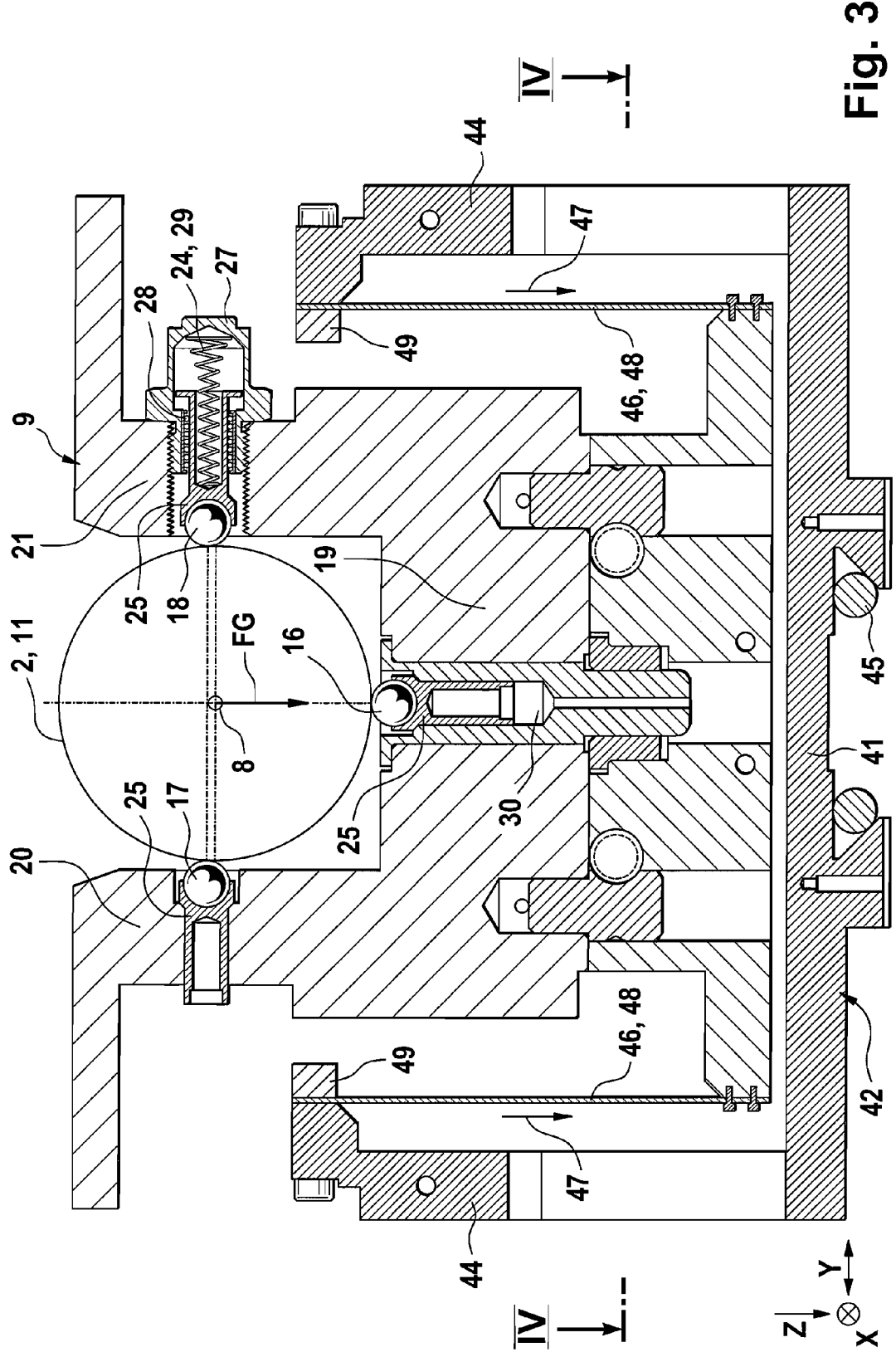
FIG. 3 is a longitudinal section view through the device from FIGS. 1 and 2.

FIG. 3—The receptacle 9 is constructed with a U shape, having a base 19 and two legs 20 and 21 projecting vertically from this base. The articulated shaft section 11 is held without constraint between the legs 20 and 21. For this purpose, balls 16, 17, 18, which can rotate relative to the receptacle 9 in an arbitrary directional sense about their own center, are supported on the legs 20 and 21 and on the base 19. The first articulated shaft section 11 is supported on the force of gravity side at its center of gravity 8 on the first ball 16.

So that the ball 16 is mounted rotatably, the articulated shaft section 11 is mounted so that it can move longitudinally on the first ball 16 along its longitudinal axis 22 in the device 1. The longitudinal axis 22 of the articulated shaft section 11 is the axis, which intersects the rotational axis 14 in the ideal position and which is the rotational axis of the articulated shaft section 11 in the articulated shaft arrangement installed in the vehicle.

The second balls 17 and 18 arranged at a distance to each other on the peripheral side relative to the first ball 16 about the longitudinal axis 22 of the articulated shaft section are provided for the lateral guidance of the articulated shaft section 11. The articulated shaft section 11 in this case concerns a total of three balls 16, 17, and 18 without being in contact with the receptacle 9. Because all of the balls 16, 17, and 18 are supported so that they can rotate, the articulated shaft section 11 is oriented in the device 1 nearly free from friction and is free from constraining forces.

The second balls 17 and 18 lie opposite each other. One of the second balls 18 is supported in a spring elastic way on the receptacle 9. It is also conceivable that both of the second balls 17 and 18 are supported in a spring elastic way and/or the first ball 16 is supported on the receptacle 9.

Each ball 17 supported in a spring elastic way on the device can be tensioned or not in a spring elastic manner against the articulated shaft section 11. If the ball(s) 17 is (are) not tensioned with the spring element 24 against the articulated shaft section 11, then each spring element 24 is a damping element, which damps vibrations of the measurement arrangement. If the ball(s) 17 is (are) tensioned against the universal shaft section 11, the universal shaft section 11 is clamped without play between the balls 17 and 18. The articulated shaft section 11 is "latched" between the balls 16, 17, 18 when placed in the receptacle 9 or the articulated shaft section 11 is clamped by adding the ball(s) 17, 18 after placement.

The lever 2 or the first articulated shaft section 11 is clamped in the longitudinal direction so that it can move freely between the balls 17 and 18 and is guided on these balls like roller bearings. Deviations of the shape and position, which could lead to twisting of the lever 2 or the first articulated shaft section 11 in the device 1 or the measurement arrangement 7 or 10, are compensated in a spring elastic manner, so that each arrangement is free from constraining forces.

The balls 16, 17, 18 are each held preferably on a bolt 25 and can rotate on the respective bolt. The bolt 25 preassembled with the respective ball 16 or 18 is either pressed directly into a corresponding hole or the bolt 25 is first preassembled into a unit comprised of the housing 27, bolt 25, a linear bearing 28 for supporting the bolt 25, a ball 17, and a helical spring as the spring element 24, which can be screwed into the receptacle 9. For this purpose, the unit has an external thread not shown in more detail and a hexagon on the housing 27. The external thread fits into an internal thread of the device. For the purpose of retrofitting, various of these units can be exchanged one for the other, which do have the same dimensions in terms of the thread of the screw-in sleeve, but can differ from each other selectively in the dimensions of the bolt, spring, and balls.

The mounting of the balls 16, 17, and 18 on the respective bolts 25 has various advantages. The balls 16, 17, and 18 can be more easily displaced in the direction of the longitudinal axis 22 or away from this axis by the change in position or length of the bolt 25. This is advantageous when retrofitting the device, for example, for shafts or articulated shafts with different diameters. In addition, the devices can be easily retrofitted for different dimensions of a wide range of articulated shafts if the bolts are exchangeable. For this purpose, the dimensions of the holes or guidance of the bolts 25 and the housing 27 are standardized so that while the bolts 25 are different from each other, for example, in the selection of the balls, for example, all of them have a common diameter.

FIGS. 1, 2, and 3—The device 1 for measuring reaction moments and forces on a lever 2 or for measuring bending moments of a joint 12 has a carrier 42. The carrier 42 is formed from a base plate 43 and two traverses 44. The traverses 44 project at a right angle from the base plate 43. The receptacle 9 can be deflected relative to the carrier 42 in opposite measurement directions fixed to the traverses 44. The carrier 42 is arranged fixed in place relative to the receptacle 9 on the device 1 on a sled 41. The sled 41 can be shifted on a rail 45. By shifting the sled 41, the distance between the rotational axis 3, 14, and 15 and the receptacle 9 can be adapted to the lengths of various levers or articulated shaft sections.

The receptacle 9 is suspended by pendulum arms 46 on the carrier 41 and can oscillate freely at least in the measurement directions designated with the double arrow relative to the carrier 41. In FIG. 3, the receptacle 9 is shown in the rest position, from which the receptacle can pivot to the left or right. The pendulum arms 46 are tensioned in the rest position by the weight of the receptacle 9 and by the weight of the lever 2 or articulated shaft section 11 in the Z-direction of the arrows 47 and are rigid and not elastic in the Z-direction. The pendulum arms 46 are leaf springs 48, which are elastically flexible in the Y-direction and have an essentially higher moment of resistance against bending in the X-direction (FIG. 3, perpendicular to the plane of the drawing) than in the Y-direction.

Each of the leaf springs 48 is clamped rigidly to one of the traverses 44 using a clamp 49. The leaf springs 48 are oriented parallel to each other in the device 1 and the rest position of the receptacle 9.

Figure 4:
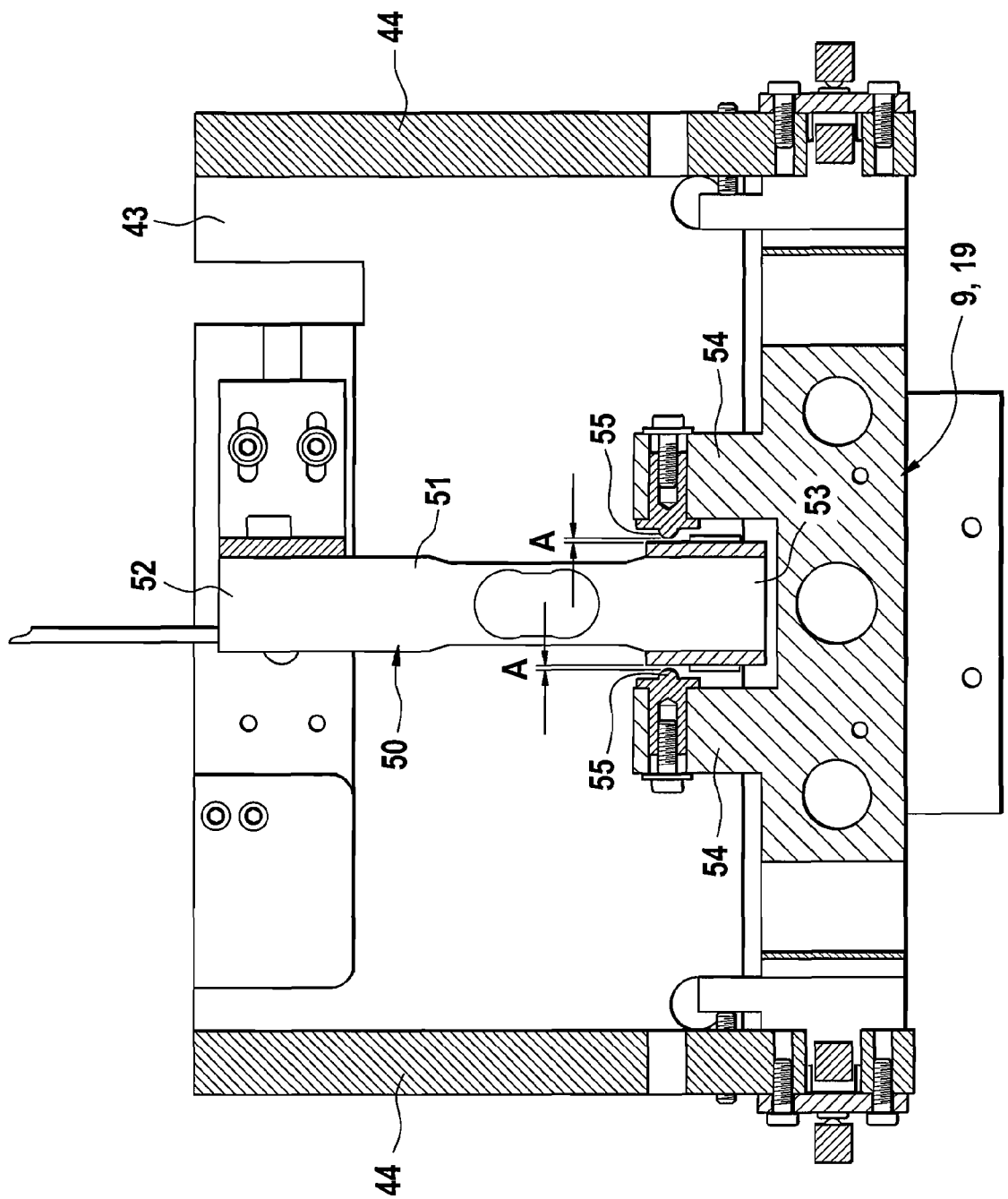
FIG. 4 is a top view onto the force measurement sensors with reference to a sectional representation of the device cut along the line IV-IV from FIG. 3.

FIG. 4—The device 1 has at least one sensor 50, which is supported fixed in place on the base plate 43 and with which the deflections of the receptacle 9 shown in section at the base 19 in FIG. 4 are measured relative to the base plate 43 of the carrier 42. The sensor 50 is a bending beam 51 with an expanding measurement strip not shown in more detail. The bending beam 51 is fixed in place relative to the device at one end 52 on the base plate 43. The other end 53 of the bending beam 51 lies opposite two stops 54 without contact in the rest position of the receptacle 9. The stops 54 project in the longitudinal direction from the receptacle 9 at a distance from each other and lie opposite each other at a distance in the measurement directions Y. The end 53 engages at the distance between the stops, so that its flanks are each separated by a play A from each stop 54. Tips of the balls 55 are fixed to the stops 54, with these tips being directed relative to each other in the measurement direction Y. The end 53 of the bending beam 51 engages at the distance with play A to the ball tips 55. If the receptacle 9 deflects in the directions of the double arrow Y, one of the ball tips 55 meets the end 53 of the bending beam 51 after traversing the play A and deflects this beam outwards. The contact between the ball tips 55 and the flank of the bending beam 51 is point-shaped. Thus, the friction, which is created by the relative movement between the end 53 and each stop 54 and which can disadvantageously influence the measurement results, can be kept as small as possible.

REFERENCE SYMBOLS

1 Device
2 Lever
3 Rotational axis
4 Rotating connection
5 Outer ring
6 Pin
7 Measurement arrangement with rotating connection
8 Center of gravity
9 Receptacle
10 Measurement arrangement with articulated shaft
11 First articulated shaft section
12 Joint
13 Second articulated shaft section
14 Rotational axis
15 Rotational axis
16 First ball
17 Second ball
18 Second ball
19 Base of the receptacle
20 Leg of the receptacle
21 Leg of the receptacle
22 Longitudinal axis
23 Straight line
24 Spring element
25 Bolt
27 Housing
28 Linear bearing
29 Helical spring
30 Pressure space
41 Sled
42 Carrier
43 Base plate
44 Traverses
45 Rail
46 Pendulum arms
47 Arrow in the longitudinal direction
48 Leaf spring
49 Clamp
50 Sensor
51 Bending beam
52 End of the bending beam
53 End of the bending beam
54 Stop
55 Ball tip

The invention claimed is:

1. Device for measuring reaction moments and forces on a lever, the device comprising at least one receptacle for the lever and with at least one carrier, the receptacle is fixed in opposite measurement directions relative to the carrier deflectable on the carrier, at least one stationary supported sensor for measuring deflections of the lever, the receptacle is suspended by at least one pendulum arm on the carrier and can oscillate freely at least in the measurement directions relative to the carrier, wherein the at least one pendulum arm in the rest position of the receptacle is tensioned by a weight of the receptacle and at least proportionally by a weight of the lever in a rigid, non-elastic manner.

2. Device according to claim 1, wherein the bending beam can be applied to an end by the receptacle pivoted from the rest position.

3. Device according to claim 1, wherein the pendulum arm is rigid in all directions perpendicular to the measurement directions.

4. Device according to claim 1, wherein the pendulum arm has a rod-shaped form, wherein the pendulum arm is elastically flexible at least in the measurement directions and has in the measurement directions, lower moments of resistance against bending than the moments of resistance against bending which the pendulum arm has in the directions perpendicular to the measurement directions.

5. Device according to claim 4, wherein the pendulum arm is clamped rigidly on the carrier.

6. Device according to claim 4, wherein the pendulum arm comprises at least one leaf spring.

7. Device according to claim 4, wherein the receptacle is suspended on of the two pendulum arms directed parallel to each other.

8. Device for measuring reaction moments and forces on a lever, the device comprising at least one receptacle for the lever and with at least one carrier, the receptacle is fixed in opposite measurement directions relative to the carrier deflectable on the carrier, at least one stationary supported sensor for measuring deflections of the lever, the receptacle is suspended by at least one pendulum arm on the carrier and can oscillate freely at least in the measurement directions relative to the carrier, the at least one pendulum arm having a rod-shaved form and is elastically flexible at least in the measurement directions and has in the measurement directions, lower moments of resistance against bending than the moments of resistance against bending which the at least one pendulum arm has in the directions perpendicular to the measurement directions, wherein the receptacle is suspended on two of the pendulum arms directed parallel to each other, wherein the weight of the receptacle and at least one part of the weight of the lever are distributed proportionally onto the pendulum arms.

9. Device according to claim 1, wherein the sensor is at least one bending beam with expanding measurement strips.

10. Device according to claim 1, wherein the carrier is arranged fixed in place relative to the device.

11. Device according to claim 1, wherein the sensor is at least one bending beam with expanding measurement strips, wherein an end of the bending beam is stationary relative to the receptacle.

12. Device according to claim 1, wherein the receptacle and the bending beam are arranged in a rest position of the receptacle contact-less relative to each other.

13. Device for measuring reaction moments and forces on a lever, the device comprising at least one receptacle for the lever and with at least one carrier, the receptacle is fixed in opposite measurement directions relative to the carrier deflectable on the carrier, at least one stationary supported sensor for measuring deflections of the lever, the receptacle is suspended by at least one pendulum arm on the carrier and can oscillate freely at least in the measurement directions relative to the carrier, wherein the lever comprises a first articulated shaft section of a joint and bending moments are measured for the first articulated shaft section that is bent relative to a second articulated shaft section, to create reaction moments and forces caused by bending moments on the first articulated shaft section in the receptacle, and the first articulated shaft section is supported at a center of gravity thereof in the receptacle.

14. Device according to claim 13, wherein the device can pivot with the first articulated joint section about a rotational axis of the joint, and the receptacle and the rotational axis are spaced apart from each other.

15. Device according to the preamble of claim 1, wherein the receptacle is arranged in the device with contact on the sensor in the rest position free from reaction forces and reaction moments.

16. Device according to claim 15, wherein the sensor is a bending beam with expanding measurement strips.

17. Device according to claim 16, wherein the bending beam is fixed in place at one end in the device and that the other end of the bending beam is opposite the receptacle in the rest position in the measurement directions.

18. Device for measuring reaction moments and forces on a lever, the device comprising at least one receptacle for the lever and with at least one carrier, the receptacle is fixed in opposite measurement directions relative to the carrier deflectable on the carrier, the receptacle is arranged in the device with contact on the sensor in the rest position free from reaction forces and reaction moments, at least one stationary supported sensor for measuring deflections of the lever, the receptacle is suspended by at least one pendulum arm on the carrier and can oscillate freely at least in the measurement directions relative to the carrier, wherein the device has at least two stops, which are coupled with the receptacle at least fixed in motion and which oppose each other in the measurement directions at a distance to each other and that the sensor engages at a distance.

19. Device according to claim 18, wherein the sensor is a bending beam with expanding measurement strips, that the bending beam is fixed in place at a first end in the device and that a second end of the bending beam away from the first end engages at a distance between stops, such that each of the stops is opposite a flank of the second end in the rest position contact-less in one of the measurement directions.

* * * * *